(12) United States Patent
Woo (10) Patent No.: US 10,692,073 B2
(45) Date of Patent: Jun. 23, 2020

(54) CARD MANAGEMENT SYSTEM HAVING CARD IMAGE MANAGEMENT FUNCTION, CARD MANAGEMENT METHOD, AND USER TERMINAL AND SERVER APPLIED TO THE SAME

(71) Applicant: SK PLANET CO., LTD., Seongnam-si, Gyeonggi-do (KR)

(72) Inventor: Jong Won Woo, Incheon (KR)

(73) Assignee: SK Planet Co., Ltd., Seongnam-si (KR)

( * ) Notice: Subject to any disclaimer, the term of this patent is extended or adjusted under 35 U.S.C. 154(b) by 911 days.

(21) Appl. No.: 14/873,789

(22) Filed: Oct. 2, 2015

(65) Prior Publication Data

US 2016/0098707 A1    Apr. 7, 2016

(30) Foreign Application Priority Data

Oct. 2, 2014    (KR) ........................ 10-2014-0133403

(51) Int. Cl.
*G06Q 40/00* (2012.01)
*G06Q 20/36* (2012.01)
*G06Q 20/38* (2012.01)
*G06K 9/00* (2006.01)

(52) U.S. Cl.
CPC ....... *G06Q 20/363* (2013.01); *G06K 9/00442* (2013.01); *G06Q 20/3825* (2013.01)

(58) Field of Classification Search
USPC .......................................................... 705/39
See application file for complete search history.

(56) References Cited

U.S. PATENT DOCUMENTS

| 2013/0054454 | A1* | 2/2013 | Purves | H04L 67/306 705/41 |
| 2014/0037220 | A1* | 2/2014 | Phillips | G06Q 20/3221 382/232 |
| 2016/0080039 | A1* | 3/2016 | Brahami | H04B 5/0031 455/41.1 |
| 2019/0259028 | A1* | 8/2019 | Purves | G06Q 20/382 |

OTHER PUBLICATIONS

A critical review of mobile payment research byTomi Dahlberg , Jie Guo , Jan Ondrus https://doi.org/10.1016/j.elerap.2015.07.006 (Year: 2015).*
Business Models for NFC based mobile payments by Johannes Sang Un Chae Department of IT Management, Copenhagen Business School, Denmark; https://doi.org/10.5278/ojs.jbm.v3i1.1046 (Year: 2015).*
NFC in cell phones: The new paradigm for an interactive world [Near-Field Communications] by Jeffrey Fischer; Publisher:IEEE; Published in:IEEE Communication megazine(vol. 47, issue 6, Jun. 2009) (Year: 2009).*

* cited by examiner

*Primary Examiner* — Hani M Kazimi
*Assistant Examiner* — Hatem M Ali
(74) *Attorney, Agent, or Firm* — Fenwick & West LLP (57) ABSTRACT

A card management system using a mobile wallet according to the present invention comprises: a user terminal having a mobile wallet for performing a finance trade function corresponding to a finance card; and a card management server which receives and stores card image information for the finance card from the user terminal, and which, when the finance card is to be used by way of the mobile wallet, searches for the stored card image information and provides the card image information to the user terminal.

13 Claims, 5 Drawing Sheets

CARD MANAGEMENT SYSTEM HAVING CARD IMAGE MANAGEMENT FUNCTION, CARD MANAGEMENT METHOD, AND USER TERMINAL AND SERVER APPLIED TO THE SAME

CROSS-REFERENCE TO RELATED APPLICATIONS

The instant application is based on and claims priority to Korean Patent Application No. 10-2014-0133403, filed on Oct. 2, 2014. The disclosure of above-listed application is hereby incorporated by reference herein in their entirety.

BACKGROUND OF THE INVENTION

1. Field of the Invention

The present invention relates to user terminal, a card management server, a card management system having the user terminal and the card management server, and a card management method which has a card image management function capable of backing up and restoring card information of a mobile wallet safely and efficiently by separating a text portion from a background image in a card image corresponding to a finance card containing personal information such as a credit card or a back security card, etc. used in the mobile wallet and storing a text portion and a background image in in a server separately.

2. Description of the Related Art

Recently, a card or a finance card which is easier to use and carry than cash is widely used as a payment means. There are various kinds of the card classified by a type of payment such as a credit card, a cash card, a transportation card, an integrated circuit (IC), etc. People can also use the card or a finance card to pay for traffic fares such as taxi fares, subway fares, bus fares, etc. in recent times.

In addition to this, the card can be used in an on-line e-commerce transaction and an automated teller machine (ATM)/cash dispenser (CD), etc. Likewise, since the number of card member stores increases, people can pay using cards in various kinds of financial transactions. Of course, people can use the credit card at toll gates at highways and tunnels, automatic vending machines, and kiosks, etc. In particular, the number of uses of the card tends to increase since the credit card is widely spread these days and the government actively reinforces a strategy for promoting the card use in order to obtain transparency in collecting taxes.

Also, in these days, a credit card payment system which uses a smart device is attaining popularity, wherein one can acquire a credit card image by using a camera executed by a smart device application and settle the payment using the acquired credit card image through a wireless communications system. The smart device can be a user terminal including a smart phone and include a mobile wallet which performs the finance trade using the finance card image (or credit card image). That is, the user can directly take an image of the credit card or the bank security card and store the taken image on the mobile wallet for later use.

On the other hand, there are items which are related to personal information such as a card number, a card expiry date, a card owner name, etc. on the directly registered card image. As for the bank security card, in particular, there can be information related to personal finance transactions which is very sensitive and not to be leaked. Therefore, there can be a problem that the personal information can be leaked since the sensitive personal information is contained in the card image which is directly registered on the mobile wallet by the user. Also, when the card image, which is directly registered by the user on the mobile wallet, is stored only on the smart phone rather than a server, there can be a problem that the card image cannot be restored from a storage device of the smart phone, when the smart phone is replaced or the smart phone breaks down.

SUMMARY OF THE INVENTION

An objective of the present invention for solving the aforementioned problems is to provide a user terminal, a card management server, a card management system having the user terminal and the card management server, and a card management method which has a card image management function capable of backing up and restoring card information of a mobile wallet safely and efficiently by separating a text portion from a background image in a card image corresponding to a finance card containing personal information such as a credit card or a back security card, etc. used in the mobile wallet and storing a text portion and a background image in in a server separately.

The objective can be obtained by a user terminal according to the present invention, comprising: an interface unit which performs communication with a card management server; an image acquiring unit which acquires a card image for a finance card; and a mobile wallet which performs a finance trade function corresponding to the finance card with an application which is provided and executed on the user terminal, wherein the mobile wallet is characterized in that it extracts a text image corresponding to a text, which includes the card information, from the card image, generates a card security image by screening the text image from the card image, and transmits at least one of the text image and position information and size information corresponding to the text image on the card image to the card management server through the interface unit.

Here, when the finance card is to be used by way of the mobile wallet, at least one of the text image, the position information, and the size information can be received from the card management server through the interface unit, a finance card image corresponding to the finance card can be generated from the card security image based on at least one of the text image, the position information, and the size information, and the finance trade function corresponding to the finance card can be performed based on the generated finance card image.

Here, at least one of the position information and the size information can be represented in a form of pixel coordinates on the card image.

Here, the card management server can include a data base which stores at least one of the text image, the position information, and the size information, and the data base can store at least one of the text image, the position information, and the size information separately.

Here, the mobile wallet or the card management server can generate a card identification (ID) for the finance card, and the data base can store at least one of the text image, the position information, and the size information with the card ID.

Here, the mobile wallet or the card management server can generate a text ID for the text, and the data base can store at least one of the text image, the position information, and the size information with the text ID.

Here, the data base can further store the card security image, the interface unit can receive the card security image, which is stored in the data base, from the card management server, when the finance card is to be used by way of the mobile wallet, and the mobile wallet cam generate the finance card image by adding the text image to the received card security image based on at least one of the position information and the size information on the card image.

Here, the user terminal can further comprise a storage unit which stores the card security image, and the mobile wallet can generate the finance card image by adding the text image to the card security image, which is stored in the storage unit, based on at least one of the position information and the size information on the card image.

Also, the objective can be obtained by a card management server according to the present invention, comprising: a communication unit which performs communication with a user terminal which comprises a mobile wallet for performing a finance trade function corresponding to a finance card; a data base which stores card image information for the finance card which is received from the user terminal through the communication unit; and a card information searching unit which, when the finance card is to be used by way of the mobile wallet, searches for the card image information, which is stored in the data base, and provides the card image information to the user terminal, wherein the card management system is characterized in that the user terminal can acquire a card image for the finance card, the card image information can include at least one of a text image from the card image, which represents a text including card information for the finance card, and position information and size information corresponding to the text image on the card image, and the data base can store at least one of the text image, the position information, and the size information separately.

Here, the mobile wallet can extract the text image from the card image, generate a card security image by screening the text image from the card image, generate a finance card image corresponding to the finance card from the card security image based on at least one of the text image, the position information, and the size information, and perform the finance trade function based on the generated finance card image.

Here, the data base can further store the card security image, the user terminal can receive the card security image, which is stored in the data base, from the communication unit, when the finance card is to be used by way of the mobile wallet, and the mobile wallet can generate the finance card image by adding the text image to the received card security image based on at least one of the position information and size information.

Here, the user terminal can comprise a storage unit which stores the card security image, and the mobile wallet can generate the finance card image by adding the text image to the card security image, which is stored in the storage unit, based on at least one of the position information and size information. Also, the objective can be obtained by a card management method using a user terminal having a mobile wallet, comprising: acquiring a card image for a finance card; extracting a text image which corresponds to a text including card information from the card image; generating a card security image by screening the text image from the card image; and transmitting at least one of the text image and position information and size information corresponding to the text image on the card image to a card management server.

Here, the card management method according to the present invention can further comprise: receiving, when the finance card is to be used by way of the mobile wallet, at least one of the text image, the position information, and the size information from the card management server; generating a finance card image corresponding to the finance card from the card security image based on at least one of the text image, the position information, and the size information; and performing a finance trade function corresponding to the finance card based on the generated finance card image.

Here, at least one of the position information and the size information can be represented in a form of pixel coordinates on the card image.

Here, the card management server can include a data base which stores at least one of the text image, the position information, and the size information, and the data base can store at least one of the text image, the position information, and the size information separately.

Also, the objective can be obtained by a card management system through a mobile wallet according to the present invention, comprising: a user terminal which includes the mobile wallet for performing a finance trade function corresponding to a finance card; a card management server which receives and stores card image information for the finance card from the user terminal, and which, when the finance card is to be used by way of the mobile wallet, searches for the stored card image information and provides the card image information to the user terminal, wherein the card management system is characterized in that the user terminal can acquire a card image for the finance card, the card image information can include at least one of a text image from the card image, which represents a text including card information for the finance card, and position information and size information corresponding to the text image on the card image, and the card management server can store at least one of the text image, the position information, and the size information separately.

According to the present invention, there can be provided to provide a user terminal, a card management server, a card management system having the user terminal and the card management server, and a card management method which has a card image management function capable of backing up and restoring card information of a mobile wallet safely and efficiently by separating a text portion from a background image in a card image corresponding to a finance card containing personal information such as a credit card or a back security card, etc. used in the mobile wallet and storing a text portion and a background image in in a server separately.

DETAILED DESCRIPTION OF THE INVENTION

Technical terms used herein are used merely for illustrating specific embodiments, and it is to be noted that they are not intended to limit technical spirit disclosed in this specification. Also, the technical terms used herein are to be construed by the meanings normally accepted by the person having ordinary skill in the relevant art, unless specifically defined by other meanings in this specification, and it is neither to be construed by excessively comprehensive meanings nor excessively narrow meanings. Also, when the technical terms used herein are determined to be wrong technical terms which fail to represent the technical spirit disclosed in this specification correctly, the terms are to be replaced by the technical terms which can be accurately understood by the person having ordinary skill in the art. Also, the general terms used in this specification are to be construed as defined in the dictionaries or according to context, and they are not to be construed in an excessively narrow meaning.

Also, the singular representation used in this specification includes plural representations unless it is clearly expressed in the context to the contrary. The terms "include" or "is composed of" in this specification are not to be construed to necessarily include all components and all steps cited in this specification, and it should be construed to exclude some components or some steps or further include additional components and steps.

Also, the terms representing an ordinal number such as first, second, etc. used in this specification can be used to explain various components, however, the components are not to be limited by these terms. These terms are used only for discriminate one component from other components. For example, the first component can be entitled as a second component, and similarly, the second component can be entitled as the first component, without departing from the technical scope of the present invention.

In the following, embodiments disclosed in this specification are to be described in detail by referring to the appended figures, wherein the same reference numerals are given to the same or like components irrespective of the number of the figures, and duplicate description on them will be omitted.

Also, when it is determined that a detailed description on a relevant known art will obscure the subject matter disclosed in the specification while describing the technologies disclosed in this specification, the detailed description will be omitted. Also, it is to be noted that the appended figures are only for facilitating the technical spirit disclosed in this specification and the technical spirit are not to be construed to be limited by the appended figures.

Figure 1:
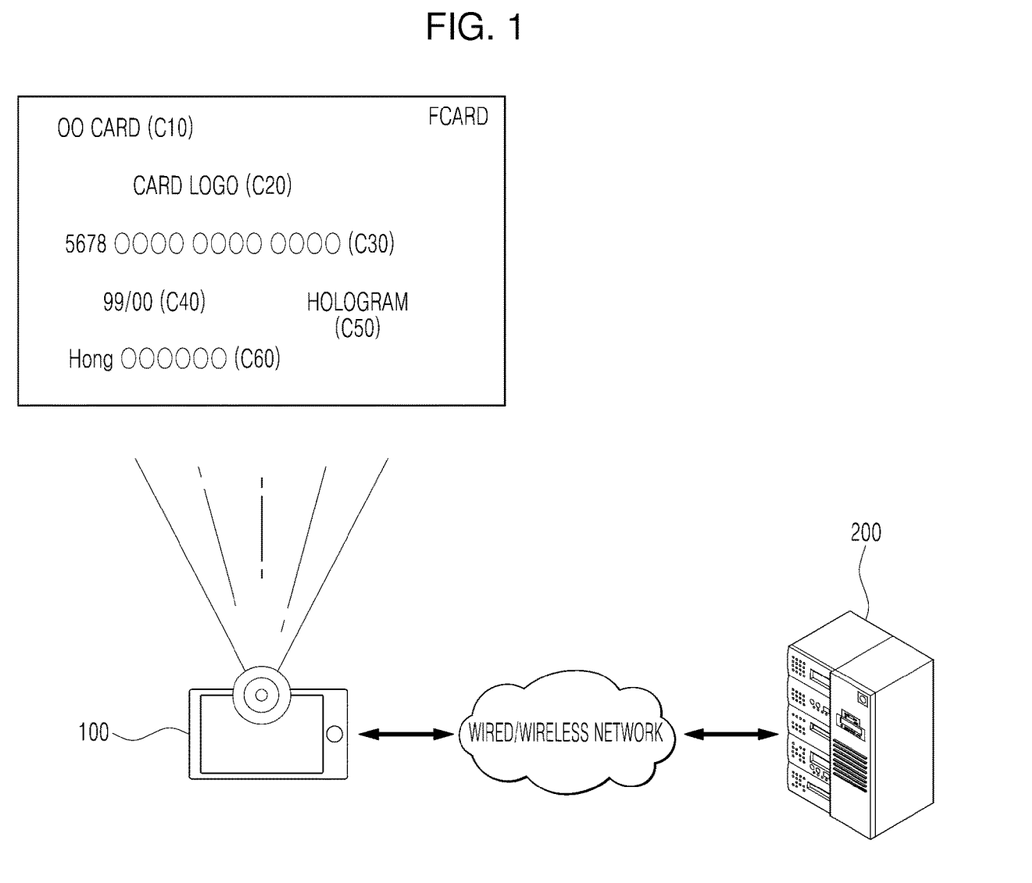
FIG. 1 is a schematic configuration of a card management system according to an embodiment of the present invention.

FIG. 1 is a schematic configuration of a card management system according to an embodiment of the present invention.

When referring to FIG. 1, the card managing system according to an embodiment described in the instant application can comprise a user terminal 100 and a card management server 200. In addition to this, the card management server can further comprise various components for performing a card management function or a card image management function according to an embodiment described in the instant application.

As shown in the figures, in the card managing system according to an embodiment described in the instant application, the user terminal 100, which includes a mobile wallet, is connected to the card management server 200 through wired and wireless networks or a wired/wireless communication network (refer to FIG. 1) and can provide the card management function according to the technology described in the instant application. Here, the wired and wireless networks can support various communication methods or communication protocols. For example, the wired/wireless network can support at least one communication method or communication protocol among a mobile communication network, a transfer control protocol/Internet protocol (TCP/IP) Transmission control protocol/Internet protocol, a local area network (LAN), a Wireless LAN, a Wi-Fi, a wireless broadband (Wibro), and a world interoperability for microwave access (Wimax).

In the following, the components will be explained in detail one by one.

The user terminal 100 can be implemented as a known smart phone, a tablet PC, a personal digital assistant (PDA), a laptop PC, etc. which can perform data communication through a wired or wireless network, and can be equipped with various known application programs such that the user terminal can be connected to a platform, which provides the respective applications, and exchange information with the platform. According to an embodiment, the user terminal 100 can comprise a mobile wallet for performing a finance trade function such as a credit card payment or a bank note deposit/withdrawal trade corresponding to a finance card such as a credit card or a bank card.

Also, according to an embodiment, the mobile wallet can perform the finance trade by using the card image for the finance card. That is, the user can directly take an image of the credit card or the bank security card and store the taken image on the mobile wallet for later use.

According to an embodiment, the user terminal 100 can acquire the card image for the finance card FCARD. For example, the finance card FCARD can be at least one of a credit card, a check card, a debit card, a transportation card, a membership card for a company which provides a specific service, a bank card, and a back security card.

According to an embodiment, the user terminal 100 can acquire the card image by taking a picture of the finance card FCARD using a camera which is provided on the user terminal. The camera can process a picture frame such as a still image or a moving picture, etc. which is obtained by an image sensor at a photographing mode. The processed picture frame can be displayed on a display unit (not shown in the appended figures) which is provided on the user terminal 100. The picture frame which is processed at the camera can be stored in a storage unit 140, which is provided on the user terminal 100, or can be transmitted to outside through the interface unit 110 through the interface unit 110 (refer to FIG. 2 for more details). Here, there can be at least two cameras according to a use environment.

The user terminal 100 can extract the card image information for the finance card FCARD from the card image. According to an embodiment, the card image information can include at least one of a text image, which represents a text including card information for the finance card, from the card image, and position information and size information corresponding to the text image on the card image.

Here, the card information can include at least one of a name of a finance card company for the finance card C10, a finance card number C30, an owner name of the finance card C60, an expiry date of the finance card C40, a security number for performing the finance trade function, a logo of a finance card issuance company C20, and an anti-duplication hologram C50 (refer to FIG. 1 for more details).

Meanwhile, the card management server 200 can receive the card information for the finance card from the user terminal 100 and store the received card information. Also, the card management server 200 can play a role of searching for the stored card information and providing the searched card information to the user terminal 100, when the finance card FCARD is to be used by way of the mobile wallet. Also, the card management server 200 can separate at least one of the text image, the position information, and the size information from one another in a physical way or a logical way and store the separated result.

It will be explained in detail for a more specific configuration of the aforementioned card management server 200 by referring to FIG. 3 below.

Figure 2:
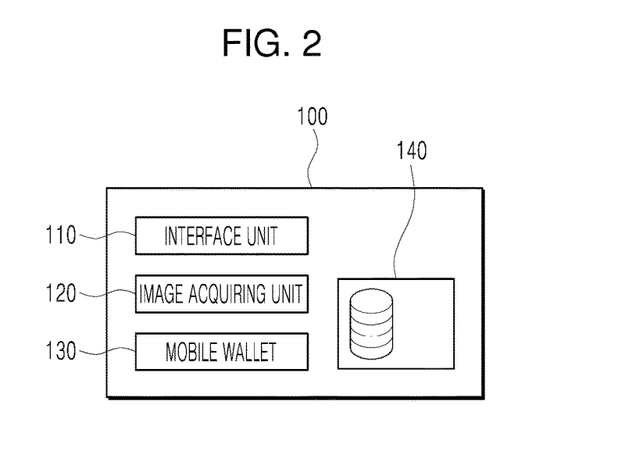
FIG. 2 is a block diagram showing a configuration of a user terminal according to an embodiment of the present invention disclosed in the instant application.

FIG. 2 is a block diagram showing a configuration of a user terminal according to an embodiment of the present invention disclosed in the instant application.

When referring to FIG. 2, the user terminal 100 according to an embodiment described in the instant application can include an interface unit 110, an image acquiring unit 120, and a mobile wallet 130, and, in a specific embodiment, can further include a storage unit 140 and a display unit (not shown in the appended figures).

Here, an overall configuration of the user terminal 100, which includes the interface unit 110, the image acquiring unit 120, the mobile wallet 130 and the storage unit 140, or a part thereof can be embodied as a hardware module or a software module, or can be embodied as a combination thereof. In addition to this, the user terminal 100 can further comprise various components for performing a card management function according to an embodiment described in the instant application.

In the following, the components will be explained in detail one by one.

It is to be understood that the description for some parts, which are the same as related parts of the user terminal disclosed in the card management system shown in FIG. 1, can be omitted, and that the user terminal 100 will be explained in more detail in terms of functions for the specified hardware components in the following.

The interface unit 110 can play a role of performing communication with external devices. Here, the external device can be the card management server 200. The interface unit 110 can communicate with the external device by using various communication methods or communication protocols. For example, the interface unit 110 can communicate with the external device by using at least one of communication method or communication protocol among a mobile communication network, a transfer control protocol/Internet protocol (TCP/IP) Transmission control protocol/Internet protocol, a local area network (LAN), a Wireless LAN, a Wi-Fi, a wireless broadband (Wibro), and a world interoperability for microwave access (Wimax).

According to an embodiment, the interface unit 110 can transmit the text image, which is extracted from the card image corresponding to the finance card FCARD by the mobile wallet 130, and position information and size information corresponding to the text image on the card image to the card management server 200.

Also, when the finance card FCARD is to be used by way of the mobile wallet 130, the interface unit 110 can play a role of receiving at least one of the text image, the position information, and the size information from the card management server 200.

According to an embodiment, when the finance card FCARD is to be used by way of the mobile wallet 130, the user terminal 100 can receive the card security image, which is stored in a data base 220 provided in the card management server 200 (refer to FIG. 3 for more details), from the card management server 200.

The card security image can represent an image which is obtained by screening the text image from the card image. In this case, the mobile wallet 130 can generate a finance card image corresponding to the finance from the card security image based on at least one of the text image, the position information, and the size information, and perform the finance trade function corresponding to the finance card based on the generated finance card image.

On the other hand, in an embodiment in which the card security image is stored inside the user terminal 100 such that the finance card image is generated inside the user terminal, the interface unit 110 can receive at least one of the text image, the position information, and the size information from the card management server 200, and the mobile wallet 130 retrieves the card security image from the storage unit 140 and uses the retrieved image for generating the finance card image.

In this case, the mobile wallet 130 can generate the finance card image by adding the text image to the stored card security image, which is stored in the storage unit 140, based on at least one of the position information and the size information on the card image.

The image acquiring unit 120 can play a role of acquiring the card image for the finance card FCARD. In order to accomplish this, the image acquiring unit 120 can include at least one camera. That is, the image acquiring unit 120 can acquire the card image by taking a picture of the finance card FCARD using a camera which is provided on the user terminal 100.

The camera can process a picture frame such as a still image or a moving picture, etc. which is obtained by an image sensor at a photographing mode. The processed picture frame can be displayed on a display unit (not shown in the appended figures) which is provided on the user terminal 100. The picture frame which is processed at the camera can be stored in a storage unit 140, which is provided on the user terminal 100, or can be transmitted to outside through the interface unit 110 through the interface unit 110. There can be more than two cameras according to a use environment.

Basically, the mobile wallet 130 can play a role of performing the finance trade corresponding to the finance card FCARD by using the card image for the finance card FCARD. That is, the user can directly take an image of the credit card or the bank security card and store the taken image on the mobile wallet 130 for later use.

According to an embodiment, the mobile wallet 130 can extract the text image corresponding to the text, which includes the card information, from the card image which is acquired by the image acquiring unit 120. Also, the mobile wallet 130 can generate the card security image which is obtained by screening the text image from the card image.

Also, the mobile wallet 130 can transmit at least one of the text image, and the position information and the size information corresponding to the text image on the card image to the card management server 200. Also, when the finance card FCARD is to be used, the mobile wallet 130 can receive at least one of the text image, the position information, and the size information from the card management server 200.

Also, the mobile wallet 130 can generate the finance card image corresponding to the finance card FCARD from the card security image based on at least one of the text image, the position information, and the size information. Also, the mobile wallet 130 can perform the finance trade function corresponding to the finance card based on the generated finance card image. Here, the finance card FCARD can be at least one of a credit card, a check card, a debit card, a transportation card, a membership card for a company which provides a specific service, a bank card, and a back security card.

Also, the card information can be the one which includes at least one of a name of a finance card company for the finance card FCARD, a finance card number, an owner name of the finance card FCARD, an expiry date of the finance card FCARD, a security number for performing the finance trade function, a logo of a finance card issuance company, and an anti-duplication hologram.

According to an embodiment, at least one of the position information and the size information can be represented in a form of pixel coordinates on the card image.

According to an embodiment, the card management server 200 can include a data base 220 which stores at least one of the text image, the position information, and the size information. In this case, data base can be a component which separates at least one of the text image, the position information, and the size information from one another in a physical way or a logical way and stores the separated result.

According to an embodiment, the mobile wallet 130 or the card management server 200 can generate a card ID for the finance card FCARD, and the data base 220 can store at least one of the text image, the position information, and the size information with the card ID.

Also, according to an embodiment, the mobile wallet 130 or the card management server 200 can generate a text ID for the text, and the data base 220 can store at least one of the text image, the position information, and the size information with the text ID.

According to an embodiment, the data base 220 can further store the card security image. In this case, when the finance card is to be used by way of the mobile wallet, the data base 110 can receive the card security image, which is stored in the data base 220, from the card management server 200, and the mobile wallet 130 can generate the finance card image by adding the text image to the received card security image based on at least one of the position information and size information on the card image.

According to another embodiment, the storage unit 140 can store the card security image, and the interface unit 110 can transmit only the text image and the position/size information to the card management server 200.

In this case, the mobile wallet 130 can generate the finance card image by adding the text image to the stored card security image, which is stored in the storage unit, based on at least one of the position information and the size information on the card image. The storage unit 140 can play a role of storing the information which is received, processed, and generated by the user terminal 100. For example, the storage unit 140 can store a program for process and control functions of the mobile wallet 130, and can perform a function for temporarily storing data which is inputted and outputted, such as a user input through a user interface, a control process procedure, or a control result.

Also, for example, the storage unit 140 can store a user interface (UI) or a graphic user interface (GUI) which is related to the function provided by the user terminal 100.

Basically, the storage unit 140 can play a role of storing the information, which is received by the interface unit 110, the card image, which is acquired by the image acquiring unit 120, and the information, which is processed or generated by the mobile wallet 130 such as the card security image, the text image, the position information, and the size information.

Also, in an embodiment in which the card security image is stored inside the user terminal 100 and the finance card image is generated in the user terminal, the storage unit 140 can play a role of storing the card security image.

In this case, as aforementioned above, the mobile wallet 130 can generate the finance card image by adding the text image to the stored card security image, which is stored in the storage unit 140, based on at least one of the position information and the size information on the card image.

The storage unit 140 can include at least one type of storage medium, such as a flash memory type storage medium, a hard disk type storage medium, a solid state disk (SSD) or a solid state drive (SSD), a multimedia card micro type storage medium, a card memory type storage medium such as a secure disk (SD) or an extended disk (XD) memory, etc., a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Basically, the display unit can play a role of displaying the information, which is received by the interface unit 110, the card image, which is acquired by the image acquiring unit 120, and the information, which is processed or generated by the mobile wallet 130 such as the card security image, the text image, the position information, and the size information on a display screen.

Also, the display unit can display a user interface (UI) or a graphic user interface (GUI) which is related to the function provided by the user terminal 100.

The display unit can include at least one of a liquid crystal display (LCD), a thin film transistor (TFT) liquid crystal display, an organic light-emitting diode (OLED), a flexible display (FD), and a 3D display.

And, there can be at least two display units according to the implementation of the user terminal 100. For example, an external display unit (not shown in the appended figures) and an internal display unit (not shown in the appended figures) can be provided on the user terminal 100 at the same time.

When the display unit is combined with a sensor, which senses a touch operation ("touch sensor", hereinafter), to form an interlayer structure ("touch screen", hereinafter), the display unit can be used as an input device as well as an output device. The touch sensor can have, for example, a form of a touch film, a touch sheet, and a touch pad, etc.

Figure 3:
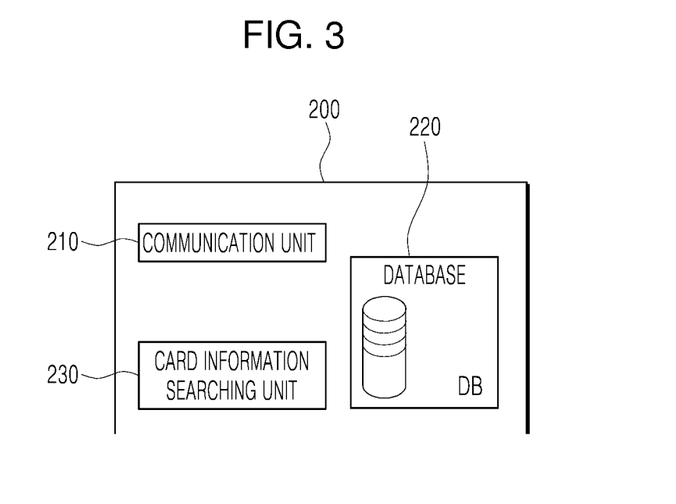
FIG. 3 is a block diagram showing a configuration of a card management server according to an embodiment of the present invention disclosed in the instant application.

FIG. 3 is a block diagram showing a configuration of a card management server according to an embodiment of the present invention disclosed in the instant application.

When referring to FIG. 3, the card management server 200 according to an embodiment described in the instant application can include a communication unit 210, a data base 220, and a card information searching unit 230. Here, an overall configuration of the card management server 200, which includes the communication unit 210, the data base 220, and the card information searching unit 230, or a part thereof can be embodied as a hardware module or a software module, or can be embodied as a combination thereof. In addition to this, the card management server 200 can further comprise various components for performing a card management function according to an embodiment described in the instant application.

In the following, the components will be explained in detail one by one.

However, it is to be understood that the description for some parts, which are the same as related parts of the card management system shown in FIG. 1 and the card management server provided in the user terminal shown in FIG. 2 can be omitted, and that the card management server 200 will be explained in more detail in terms of functions for the specified hardware components in the following.

The communication unit 210 can play a role of performing communication with the user terminal 100 which includes a mobile wallet 130 for performing the finance trade function corresponding to the finance card.

The communication unit 210 can perform communication with the user terminal 100 through various communication types and various communication protocols.

For example, the communication unit 210 can communicate with the user terminal 100 by using at least one of communication method or communication protocol among a mobile communication network, a transfer control protocol/Internet protocol (TCP/IP) Transmission control protocol/Internet protocol, a local area network (LAN), a Wireless LAN, a Wi-Fi, a wireless broadband (Wibro), and a world interoperability for microwave access (Wimax).

According to an embodiment, the communication unit 210 can receive the card image information for the finance card (FCARD) from the user terminal 100.

Here, the card image information can include at least one of a text image, which represents a text including card information for the finance card FCARD, from the card image, and position information and size information corresponding to the text image on the card image.

Also, the card information can include at least one of a name of a finance card company for the finance card FCARD, a finance card number, an owner name of the finance card FCARD, an expiry date of the finance card FCARD, a security number for performing the finance trade function, a logo of a finance card issuance company, and an anti-duplication hologram.

Also, the communication unit 210 can play a role of transmitting the card image information, which is stored in the data base 220, to the user terminal 100, when the finance card FCARD is to be used by way of the mobile wallet 130.

The data base 220 can play a role of storing the card image information, which is received form the user terminal 100 through the communication unit 210, for the finance card FCARD.

Also, the data base can separate at least one of the text image, the position information, and the size information from one another in a physical way or a logical way and store the separated result.

According to an embodiment, the mobile wallet 130 can be the one which extracts the text image from the card image, generates a card security image by screening the text image from the card image, generates a finance card image corresponding to the finance card from the card security image based on at least one of the text image, the position information, and the size information, and performs the finance trade function based on the generated finance card image.

According to an embodiment, the data base 220 can further store the card security image.

In this case, the user terminal 100 can receive the card security image, which is stored in a data base 220, from the communication unit 210, when the finance card FCARD is to be used by way of the mobile wallet 130.

Also in this case, the mobile wallet 130 can generate the finance card image by adding the text image to the received card security image based on at least one of the position information and the size information.

According to another embodiment, the user terminal 100 can comprise a storage unit 140 which stores the card security image, and the mobile wallet 130 can be the one which generates the finance card image by adding the text image to the card security image, which is stored in the storage unit, based on at least one of the position information and size information (refer to FIG. 2 for more details).

The data base 220 can include at least one type of storage medium, such as a flash memory type storage medium, a hard disk type storage medium, a solid state disk (SSD) or a solid state drive (SSD), a multimedia card micro type storage medium, a card memory type storage medium such as a secure disk (SD) or an extended disk (XD) memory, etc., a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The card information searching unit 230 can play a role of searching for the card image information, which is stored in the data base 220, and providing the searched result to the user terminal 100, when the finance card FCARD is to be used by way of the mobile wallet 130.

Specifically, the card information searching unit 230 can search for or inquire about specific card image information corresponding to a specific finance card among a plurality of pieces of card image information stored in the data base 220, when a use request for the specific finance card is received from the user terminal 100.

When the specific card image information is searched, the card information searching unit 230 can provide the specific card image information to the user terminal 100 through the communication unit 210.

For example, when a use request for a 'credit card A' is received from the user terminal 100, the card information searching unit 230 can search for a 'card number', which is the card information corresponding to the 'credit card A', text images corresponding to the 'card number', the 'card owner name', and the 'card expiry date', and position coordinates and size information of the text images corresponding to the 'credit card A' on the card image, and provide the searched text images, position coordinates, and the size information to the user terminal 100.

In this case, the mobile wallet 130, which is provided in the user terminal 100, can add the card image information to the card security image to generate the finance card image corresponding to the finance card which is to be used at last.

Then, the mobile wallet 130 can play a role of the finance trade function provided by the finance card FCARD by using the finance card image.

Figure 4:
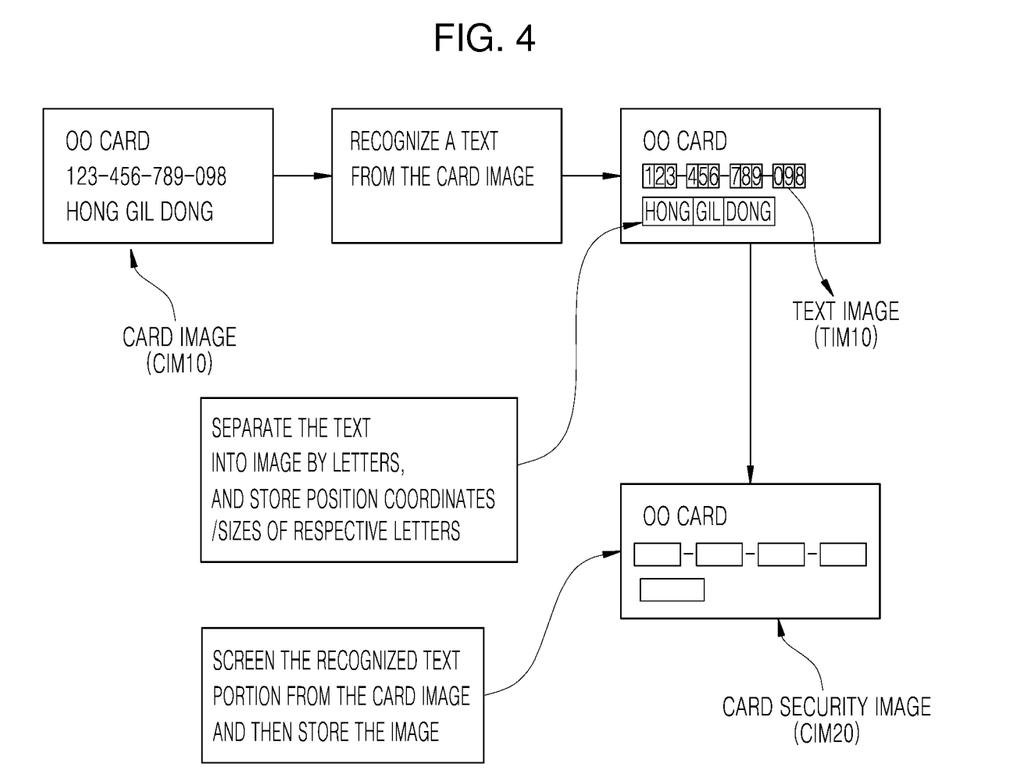
FIG. 4 is an illustration showing a card image storing process according to a specified embodiment of the present invention disclosed in the instant application.

FIG. 4 is an illustration showing a card image storing process according to a specified embodiment of the present invention disclosed in the instant application.

At first, when referring to FIG. 4, a user terminal 100 having a card management function (refer to FIG. 2 for more details) can acquire the card image CIM10 for a finance card (a OO card with a card number of 123-456-789-0980) which is owned by a user 'Hong Gil Dong'.

Next, the user terminal 100 can load an image, which is acquired by taking an image of the credit card or the bank security card, etc. to be used, in the mobile wallet 130 (refer to FIG. 2 for more details).

Next, the user terminal 100 can recognize the text information such as the card number and the expiry date, etc. from the loaded image, and the position coordinates and the size of respective letters on the image (a step of "RECOGNIZE A TEXT FROM THE CARD IMAGE", refer to FIG. 4 for more details) to generate the text image TIM10, the position coordinates, and the size information corresponding to the text image TIM10, and store the recognized result.

In another embodiment, the user can directly assign the positions and the sizes of corresponding letters.

The text image TIM10 of the recognized text portion is separated by letters, and then can be encoded to be stored in the card management server 200 with the card ID.

Also, the letter image or the text image, and the position coordinates and the size of TIM10 can be stored in the encoded data base 220 of the card management server 200 with the card ID and the ID for the respective text images (a step of "SEPARATE THE TEXT INTO IMAGE BY LETTERS, AND STORE POSITION COORDINATES/SIZES OF RESPECTIVE LETTERS", refer to FIG. 4 for more details).

Also, the mobile wallet 130 generates a card security image CIM20 by screening the text portion, which is separated from the card image CIM10, such that the text portion cannot be seen (for example, by applying a black color to the corresponding text portion) (a step of "SCREEN THE RECOGNIZED TEXT PORTION FROM THE CARD IMAGE AND THEN STORE THE IMAGE" refer to FIG. 4 for more details). Then, the mobile wallet can encode the card security image to store the encoded result on the user terminal 100 or in the card management server 200.

Figure 5:
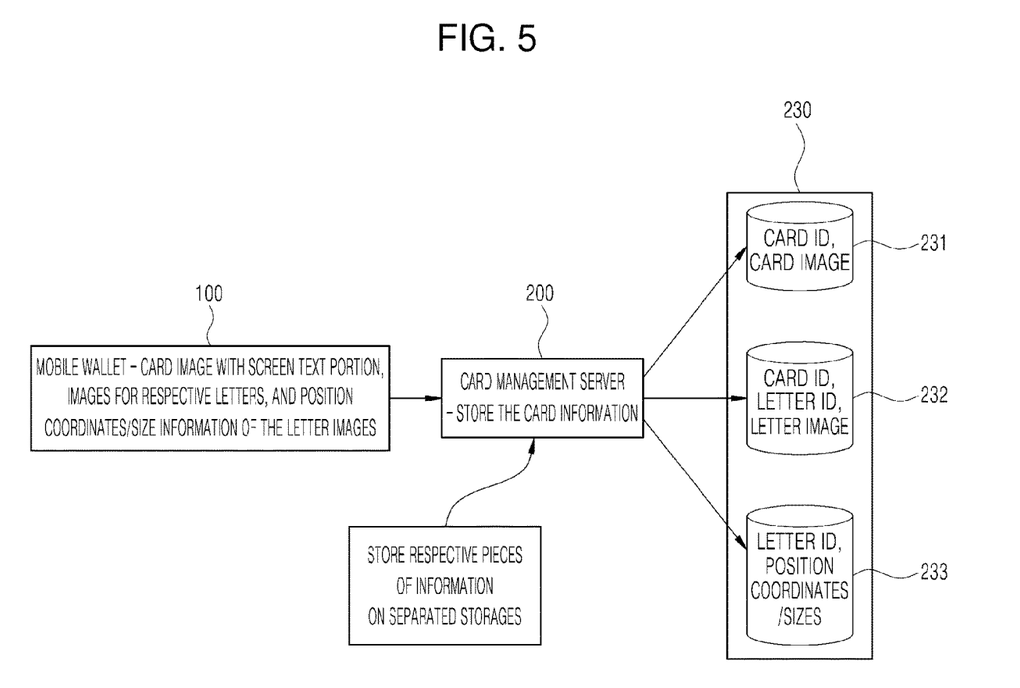
FIG. 5 is an illustration showing a process of storing the card image information in a card management server according to a specified embodiment of the present invention disclosed in the instant application.

FIG. 5 is an illustration showing a process of storing the card image information or the card information in a card management server according to a specified embodiment of the present invention disclosed in the instant application.

When referring to FIG. 5, the user terminal 100 can transmit the card image CIM10, images for respective letters (or, the text image TIM10), and position coordinates/size information of the letter images, which are extracted by the mobile wallet 130, to the card management server 200.

Here, it is possible that the card image CIM is not to be transmitted to the card management server 200 but stored inside the user terminal 100.

The card management server 200 can separate the card image CIM10, the images for respective letters (or the text image TIM10), and the position coordinates/size information of the letter images, which are the card image information, from one another and store the separated result (a step of "STORE RESPECTIVE PIECES OF INFORMATION ON SEPARATED STORAGES", refer to FIG. 5 for more details).

Here, the data base 230 can include a first storage 231, which stores the card ID and the card image, a second storage 232, which stores the card ID, the text ID, and a letter ID, and a third storage 233 which stores the text ID, the position coordinates, and the size information, and the first, second, and third storages are separated from one another in a physical or logical manner.

Figure 6:
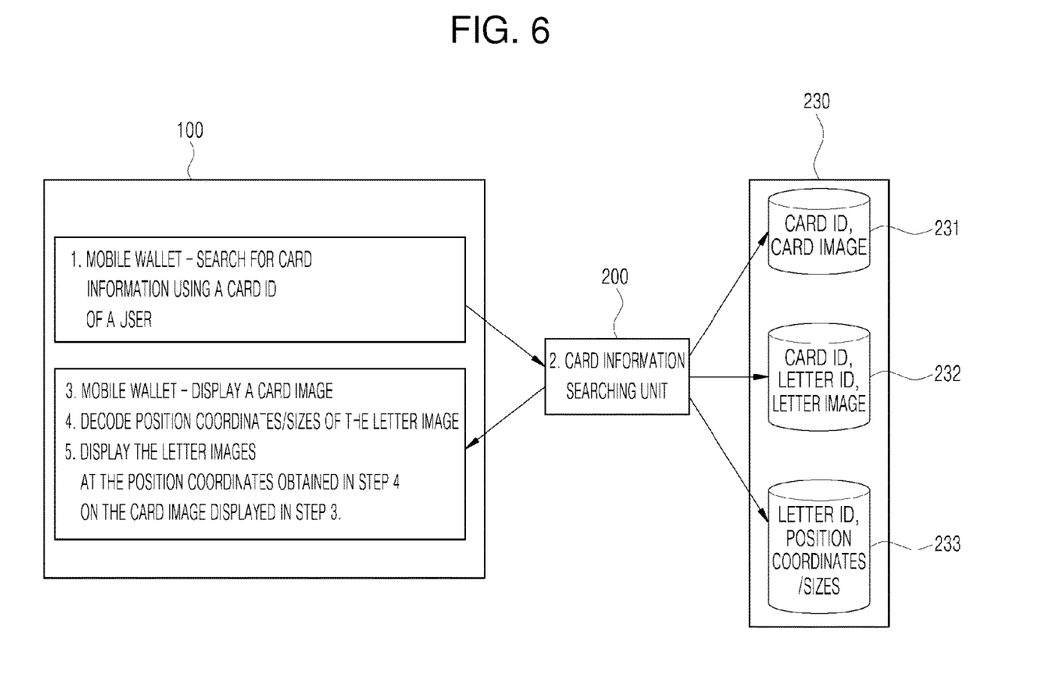
FIG. 6 is an illustration showing a process of displaying a finance card image according to a specified embodiment of the present invention disclosed in the instant application.

FIG. 6 is an illustration showing a process of displaying a finance card image according to a specified embodiment of the present invention disclosed in the instant application.

When referring to FIG. 6, the mobile wallet 130 can download the image of a card, which is stored on the user terminal 100 or in the card management server 200, in order to display the card image of the corresponding finance card.

In order to accomplish this, the mobile wallet 130 can request the card information searching unit 230 of the card management server 200 to search for the card information based on the card ID of the user.

The card ID is used for searching for the card information in order to generate the finance card image, and can be the one which is generated by the user terminal 100 when the card image is generated and acquired, or which is generated by the card management server 200 when the card image information is received.

Next, the user terminal 100 can download text portion images TIM10 of the corresponding card from the card management server 200 by using the ID of the corresponding card and decode the downloaded text portion images of the corresponding card.

Next, the user terminal 100 can download the position information of the text portion image (a text image, TIM10) of the card management server by using the ID of the corresponding card and the IDs of the respective text images, and decode the downloaded result.

Next, the mobile wallet 130 of the user terminal 100 can generate the finance card image, which is to be used at last in the financial transaction, by drawing the respective text images TIM10 according to the size at the corresponding position on the card security image CIM20.

Even when the storage device of the smart phone of the user breaks down or the smart phone is lost, the card restoration process can also be performed in a way similar to the card image display process shown in FIG. 6.

The card restoration process can be performed by installing the mobile wallet on a new smart phone and undergoing a card information restoration process.

At first, the user terminal 100 can download all of the card ID of the users stored in the card management server 200, and then display the finance card on the mobile wallet 130 by performing a process similar to the card image display process shown in FIG. 6.

The user terminal 100 can recognize the information, which is not to be leaked from the mobile wallet 130, such as a card number and an expiry date, etc. of the credit card by recognizing the text information from the card image CIM10, encode the image of the text portion (text image, TIM10) and position/size values of respective images, and then store the encoded result in the card management server 200.

The user terminal 100 can store the card security image CIM20, which is generated by applying an additional color to or screening the text portion of the card image CIM10, on the storage unit 140 of the user terminal 100 or in the card management server 200.

In the similar way, the card security image CIM20, the text image TIM10, and the position coordinates/size information of the text image are stored separately, which leads to an effect of raising a security level.

In order to display the finance card on the mobile wallet, the user terminal 100 downloads the card security image CIM20 from the user terminal 100 or the card management server 200, downloads the respective text images TIM10 and position/size information of the text images TIM10 from the card management server 200, and then draws letters on the card security image CIM20 by using the text images TIM10 and the position/size information.

When the mobile wallet is to be newly installed due to a loss/breakdown, etc. of the smart phone of the user, the user terminal 100 can restore the finance card image corresponding to the finance card of the user by using the card security image and the text information (text image and position/size information) which are stored in the card management server 200.

Figure 7:
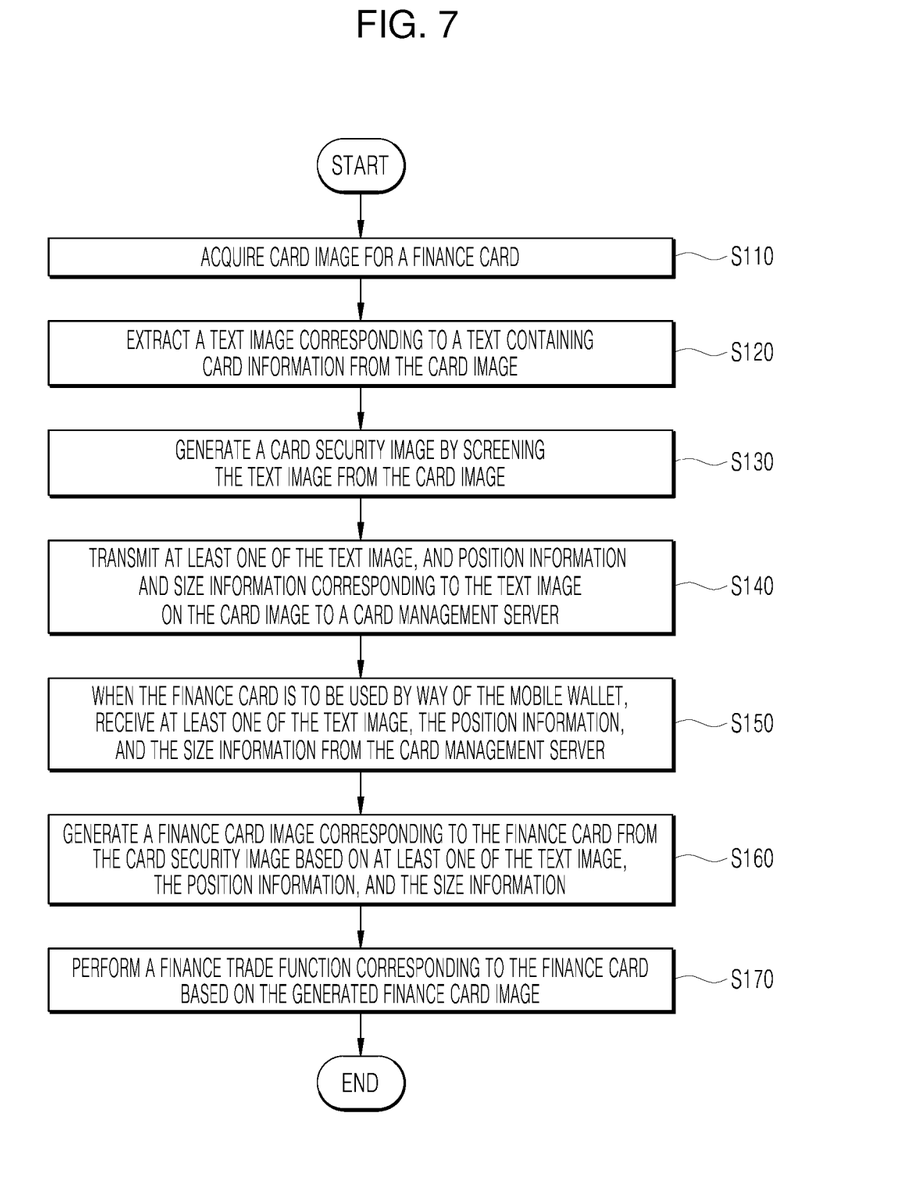
FIG. 7 is a flow chart showing a card management method according to an embodiment of the present invention disclosed in the instant application.

FIG. 7 is a flow chart showing a card management method according to an embodiment of the present invention disclosed in the instant application.

When referring to FIG. 7, a card management method according to an embodiment described in the instant application is embodied by a user terminal having a mobile wallet, and can consist of the steps as follows.

At first, a card image for a finance card can be acquired S110.

Next, a text image corresponding to a text, which includes card information, can be extracted from the card image S120.

Then, a card security image can be generated by screen the text image from the card image S130.

Next, at least one of the text image and position information and size information corresponding to the text image on the card image can be transmitted to a card management server S140.

Then, when the finance card is to be used by way of the mobile wallet, at least one of the text image, the position information, and the size information can be received from the card management server S150.

Next, the finance card image corresponding to the finance card can be generated from the card security image based on at least one of the text image, the position information, and the size information S160.

Then, the finance trade function corresponding to the finance card can be performed based on the generated finance card image S170.

According to an embodiment, the finance card can be at least one of a credit card, a check card, a debit card, a transportation card, a membership card for a company which provides a specific service, a bank card, and a back security card.

Also, according to an embodiment, the card information can be the one which includes at least one of a name of a finance card company for the finance card, a finance card number, an owner name of the finance card, an expiry date of the finance card, a security number for performing the finance trade function, a logo of a finance card issuance company, and an anti-duplication hologram.

Also, according to an embodiment, at least one of the position information and the size information can be represented in a form of pixel coordinates on the card image.

Also, according to an embodiment, the card management server can include a data base which stores at least one of the text image, the position information, and the size information, and the data base can be the one which separates at least one of the text image, the position information, and the size information from one another in a physical or logical way, and then stores the separated result.

According to the present invention described above, there is provided a method which can backup and restore card information of a mobile wallet by separating a background image and a text portion from the card image, which contains personal information of a finance card such as a credit card or a bank security card, etc. used in the mobile wallet, and then storing the separated result in the server in a safe manner. Here, by describing a case in which the finance card is a credit card as an example, a text portion such as a name, a card number, an expiry date, etc. is recognized from an image which is obtained by taking a picture of the credit card using a camera of a smart phone or a digital camera. Then, the recognized image of the text portion or the aforementioned card security image and the image of the other portion are stored separately in the server, and they can then be used in backup and restoration processes in the mobile wallet.

The technology disclosed in the instant application can be summarized by way of specified examples as follows.

1. "Store A Card Image"

(1) Load an image obtained by taking an image of a credit card, a bank security card, etc., which is stored in a mobile wallet for later use, is loaded in the mobile wallet.

(2) Recognize text information such as a card number, an expiry date, etc. from the loaded image, and recognize position coordinates and sizes of respective letters on the image. Alternatively, the user can directly assign the positions and the sizes of corresponding letters.

(3) The recognized text portion images are separated by letters, encoded with a card ID, and then stored in the server.

(4) The position coordinates and sizes of the letter images are stored in the encoded data base of the server with the card ID and the IDs of the respective letter images.

(5) A black color is applied to the text portion, which is separated from the card image as above, such that the text cannot be recognized, and the text portion card image with the black color applied thereon is encoded and stored on a user terminal or in a card management server.

2. "Display Of A Card"

(1) In order to display a finance card image in the mobile wallet, the image of the corresponding card, which is stored on the user terminal or in the card management server, is downloaded.

(2) The card management server downloads the text portion images of the corresponding card by using the ID of the corresponding card, and decodes the downloaded images.

(3) Position information of the respective text images are downloaded from a position information data base of the text portion images of the server by using the ID of the corresponding card and the IDs of the respective text images, and the downloaded information is decoded.

(4) The respective text images are drawn on the corresponding positions on the card image according to their sizes.

3. "Card Restoration"

(1) When the storage device of the smart phone of a user breaks down or the smart phone is lost, the mobile wallet is installed on a new smart phone, and a card information restoration process is performed.

(2) At first, all of the card IDs of the user, which are stored in the server, are downloaded, and then the card is displayed in the mobile wallet by performing the same process as the card display process as above.

(3) The information, which is not to be leaked from the mobile wallet, such as a card number and an expiry date, etc. of the credit card is recognized by recognizing text information from the card image, and then the image of the text portion and position/size values of respective images are encoded and stored in the server. A black color is applied to the text portion or the text portion is screened from the card image such that the text cannot be recognized, and the text portion is encoded and stored on the user terminal or in the card management server. Since the card image, the text image, and position coordinates/sizes of the text image are separately stored, a security level is raised.

(4) In order to display the finance card on the mobile wallet, the card image is downloaded from the user terminal or the card management server, the respective text images and position/size information are downloaded from the server, and then letters are drawn by using the text images and the position/size information on the card image.

(5) When the mobile wallet is to be newly installed due to a loss/breakdown, etc. of the smart phone of the user, the card information of the user can be restored by using the card images and the text information which are stored in the server.

Meanwhile, the realized articles of functional operations and subject matters described in this specification can be implemented using digital electronic circuits, or implemented as computer software, firmware, or hardware including the configuration disclosed in this specification and structural equivalents thereof, or as a combination be at least one of these implementations. The articles of realization of the subject matter described in this specification can be implemented as one or more computer program product, that is, one or more module related to computer program instructions which are encoded on a tangible program storage medium for controlling the operation of the process system or for being executed by the same.

The computer-readable medium can be a machine-readable storage device, a machine-readable storage board, a memory device, a composition of materials affecting machine-readable wave signals, and a combination of at least one of them.

The term such as "a system" or "a device" in this specification encompasses all tools, devices, and machines for processing data including, for example, a programmable processor, a computer, or a multi-processor. The process system can include a code for creating an execution atmosphere for the computer program, when requested by a code constituting a processor firmware, a protocol stack, a database management system, an operating system, or a combination of at least one of them, etc., in addition to a hardware.

The computer (also known as a program, a software, a software application, a script, or a code) can be created in all types of program languages including a compiled or interpreted language or a priori or procedural language, and can be arranged in all types including standalone programs, modules, subroutines, and other units proper to be used in a computing environment. The computer program does not necessarily correspond to a file of a file system. The program can be stored in a single file provided by the requested program, in multiple files which interact with each other (for example, files storing one or more module, low level programs or some of the code), or in a part of the file containing other programs or data (for example, one or more script stored in a markup language document). The computer program can be arranged to be positioned in one site or distributed over a plurality of sites, such that it can be executed on multiple computers interconnected via a communication network or on a single computer.

Meanwhile, the computer-readable medium which is proper for storing computer program instructions and data can include and all types of nonvolatile memories, media, and memory devices including a semiconductor memory device such as EPROM, EEPROM and flash memory device, a magnetic disk such as internal hard disk or removable disk, optical disk, a CD-ROM and a DVD-ROM disk. The processor and the memory can be supplemented by a special purpose logic circuit or integrated into the same.

The article of realization of the subject matter described in this specification can include a back-end component such as a data server, a middleware component such as an application server, or a front-end component such as a client computer having a web browser or a graphic user interface which enables a user to interact with the article of realization of the subject matter described in this specification, or can implement all combinations of these back-end, middleware, or front-end components in a computing system. The components of a system can be interconnected with each other by all types or media of digital data communication such as a communication network.

Although this specification includes details of various specific implementations, it is not to be understood as limiting for all inventions or scope to be claimed, and it should rather be understood as an explanation for the features which can be unique to specific implementations of the specific invention. Similarly, the specific features described in this specification in the context of separate implementations can be implemented to be combined in a single implementation. On the contrary, various features described in the context of the single implementation can also be implemented as discrete or proper low level combinations as well as in various implementations. Furthermore, although the features can be depicted as work in a specific combination and as claimed in the first place, one or more features from the claimed combination can be excluded from the combination in some cases, and the claimed combination can be changed to the low level combinations or sub combinations.

Also, although this specification depicts the operations in a specific order in the drawings, it is not to be understood that this specific sequence or order should be maintained or all the shown operations should be performed in order to obtain the preferred results In specific cases, multitasking and parallel processing can be preferable. Also, the division of various system components of the aforementioned embodiments are not to be construed as being required by all embodiments, and it is to be understood that the described program components and systems can generally be unified into a single software product or packaged in multiple software products.

Similarly, this specification is not intended to limit the present invention to specific terms provided. Therefore, although the present invention has been explained in detail by referring to the aforementioned examples, it is possible for the person having ordinary skill in the art to alter, change, or modify these examples without departing from the scope of the present invention. The scope of the present invention is expressed by the claims, not by the specification, and all changes and modified shapes derived from the meanings of the claims, scopes, and the equivalents thereof are construed to be included in the scope of the present invention.

What is claimed is:

1. A user terminal comprising:
   an interface module configured to communicate with a card management server;
   a camera configured to capture a visual image of a finance card;
   and a mobile wallet provided as an application in the user terminal, the mobile wallet configured to:
      extract a text image of the finance card from the visual image of the finance card using a sensor configured to detect the text image, position information of each text included in the text image, and size information of the each text included in the text image, wherein the text image comprises at least one of a card company name, a card number, a card holder name, an expiration date or a security number;
      generate a card security image by removing the text image of the finance card from the visual image of the finance card;

cause the card management server to store the generated card security image into a database by encoding the generated card security image using an encoder;

transmit, to the card management server, at least one of the text image, the position information or the size information through the interface unit transmit, to the card management server, an access request to the finance card by using a card identifier of a user;

download, from the card management server, the text image-with the card identifier of the user to decode the downloaded text image using an decoder;

download, from the card management server, the position information of the text image with the card identifier of the user to decode the downloaded position information of the text image using the decoder;

generate a finance card image by drawing the decoded text image of the finance card on the card security image based on the decoded position information of the text image; and perform a financial transaction based on the generated finance card image corresponding to the finance card.

2. The user terminal of claim 1, wherein:
at least one of the position information or the size information is represented in a form of pixel coordinates on the visual image.

3. The user terminal of claim 1, wherein the card management server comprises:
the database configured to store at least one of the text image, the position information, or the size information separately.

4. The user terminal of claim 3, wherein:
the mobile wallet or the card management server is configured to generate the card identifier of the user; and
the database is configured to store at least one of the text image, the position information, or the size information with the card identifier of the user.

5. The user terminal of claim 3, wherein:
the mobile wallet or the card management server is configured to generate an identifier of the text image; and
the database is configured to store at least one of the text image, the position information, or the size information with the identifier of the text image.

6. The user terminal of claim 3, wherein:
the database is configured to store the card security image; and
the interface unit is configured to receive, from the card management server, the stored card security image when the mobile wallet performs the financial transaction based on the finance card image corresponding to the finance card, wherein the finance card image is generated by adding the text image to the card security image based on at least one of the position information or the size information.

7. The user terminal of claim 1, wherein the user terminal further comprises:
a storage unit configured to store the card security image; and
the mobile wallet is configured to generate the finance card image by adding the text image to the stored card security image based on at least one of the position information or the size information.

8. A card management server comprising:
a communication module configured to communicate with a user terminal, wherein the user terminal comprises a mobile wallet configured to perform a financial transaction corresponding to a finance card;
a data base configured to:
store card image information of the finance card that is received from the user terminal through the communication unit, wherein the card image information comprises at least one of a text image representing a text of the finance card, position information corresponding to a position of each text of a plurality of texts included in the text image of the finance card, or size information corresponding to a size of each text of the plurality of texts included in the text image of the finance card; and
store at least one of the text image, the position information, or the size information separately; and
a card information searching unit configured to, when the mobile wallet corresponding to the finance card is used:
search a visual image of the finance card, wherein the user terminal is configured to acquire the visual image of the finance card; and
provide the searched visual image of the finance card to the user terminal, wherein the mobile wallet is configured to:
extract the text image from the visual image using a sensor configured to detect the text image, the position information and the size information;
generate a card security image by removing the text image from the visual image;
cause the card management server to store the generated card security image into the database by encoding the generated card security image using an encoder;
transmit, to the card management server, at least one of the text image, the position information, or the size information, wherein the position information corresponds to a position of each text of a plurality of texts included in the text image of the finance card and the size information corresponds to a size of each text of the plurality of texts included in the text image of the finance card;
transmit, to the card management server, an access request to the finance card by using a card identifier of a user;
download, from the card management server, the text image with the card identifier of the user to decode the downloaded text image using an decoder;
download, from the card management server, the position information of the text image with the card identifier of the user to decode the downloaded position information of the text image using the decoder;
generate a finance card image by drawing the decoded text image of the finance card on the card security image based on the decoded position information of the text image; and
perform a financial transaction based on the generated finance card image corresponding to the finance card.

9. The card management server of claim 8, wherein:
the data base is configured to store the card security image, the user terminal is configured to receive the stored card security image from the communication unit when the mobile wallet corresponding to the finance card is used, and the mobile wallet is configured to generate the finance card image by adding the text image to the received card security image based on at least one of the position information or the size information.

10. The card management server of claim 8, wherein:

the user terminal comprises a storage unit configured to store the card security image, and the mobile wallet is configured to generate the finance card image by adding the text image to the stored card security image based on at least one of the position information or the size information.

11. A method for managing a card by a user terminal having a mobile wallet, comprising:

acquiring a virtual image of a finance card;

extracting a text image of the finance card from the visual image of the finance card using a sensor configured to detect the text image, position information of each text included in the text image, and size information of the each text included in the text image;

generating a card security image by removing the text image from the virtual image;

causing a card management server to store the generated card security image into a database by encoding the generated card security image using an encoder; transmitting, to the card management server, at least one of the text image, the position information or the size information;

transmitting, to the card management server, an access request to the finance card by using a card identifier of a user;

downloading, from the card management server, the text image of the finance card with the card identifier of the user to decode the downloaded text image using an decoder;

downloading, from the management server, the position information of the text image with the card identifier of the user to decode the downloaded position information of the text image using the decoder;

generating a finance card image by drawing the decoded text image of the finance card on the card security image based on the decoded position information of the text image; and performing a financial transaction based on the generated finance card image corresponding to the finance card.

12. The method of claim 11, wherein:

at least one of the position information or the size information is represented in a form of pixel coordinates on the visual image.

13. The method of claim 11, wherein the method comprises:

storing, with the database of the card management server, at least one of the text image, the position information, or the size information separately.

* * * * *